(12) United States Patent
Woodward et al.

(10) Patent No.: US 8,402,482 B2
(45) Date of Patent: Mar. 19, 2013

(54) DISTRIBUTING CONTENT

(75) Inventors: Josh Woodward, Mountain View, CA (US); Nicholas S. Arini, Southampton (GB); Simon Birkenhead, London (GB)

(73) Assignee: Google Inc., Mountain View, CA (US)

( * ) Notice: Subject to any disclaimer, the term of this patent is extended or adjusted under 35 U.S.C. 154(b) by 309 days.

(21) Appl. No.: 12/729,270

(22) Filed: Mar. 23, 2010

(65) Prior Publication Data

US 2011/0239246 A1    Sep. 29, 2011

(51) Int. Cl.
*H04N 7/16* (2006.01)
*H04N 7/10* (2006.01)
*H04N 7/025* (2006.01)
*G06Q 30/00* (2006.01)

(52) U.S. Cl. ............ 725/22; 725/9; 725/32; 705/14.1; 705/14.11; 705/14.13

(58) Field of Classification Search .............. 725/34
See application file for complete search history.

(56) References Cited

U.S. PATENT DOCUMENTS

| | | | | |
|---|---|---|---|---|
| 2004/0107137 | A1* | 6/2004 | Skinner | 705/14 |
| 2005/0209919 | A1* | 9/2005 | Stubbs et al. | 705/14 |
| 2005/0289017 | A1 | 12/2005 | Gershom | |
| 2005/0289018 | A1 | 12/2005 | Sullivan et al. | |
| 2008/0092159 | A1* | 4/2008 | Dmitriev et al. | 725/34 |
| 2008/0235088 | A1* | 9/2008 | Weyer et al. | 705/14 |
| 2009/0276317 | A1 | 11/2009 | Dixon et al. | |
| 2009/0298480 | A1 | 12/2009 | Khambete et al. | |

OTHER PUBLICATIONS

International Search Report dated May 17, 2011.
Written Opinion of the International Searching Authority dated May 17, 2011.
Search History (conducted May 9, 2011).

* cited by examiner

*Primary Examiner* — Justin Shepard
(74) *Attorney, Agent, or Firm* — Fish & Richardson P.C.

(57) ABSTRACT

Activity involving content distributed in a first content distribution channel, such as viewership of a content item, is used to determine how related content, such as another content item, should be distributed in a second content distribution channel. The determination can be made based on a model of the relationship between activity in the first content distribution channel and activity in the second content distribution channel. Distribution information regarding how the related content is to be distributed can be created or modified based on the determination, and the related content can be distributed according to the distribution information for the related content.

9 Claims, 4 Drawing Sheets

DISTRIBUTING CONTENT

TECHNICAL FIELD

This disclosure relates to distributing content.

BACKGROUND

In many different environments, content providers want to distribute content to selected recipients. For example, advertisers want to distribute their advertisements through content distribution channels where the advertisements will be effective in communicating information to potential customers, and when the advertisements will lead to desired activity, such as a purchase of the advertiser's goods or services. In some instances, a content provider may rely on contextual information when making decisions regarding content distribution selections, including the selection of content distribution channels. For example, an advertiser may want to advertise goods and/or services relating to travel in travel magazines or during travel television programs. In some instances, a content provider may rely on targeting information, such as demographic information of potential viewers, when making content distribution selections. Additionally, content providers can rely on performance information regarding results achieved by previous content delivery selections.

SUMMARY

In situations where a content provider elects to distribute content items in two or more different content distribution channels, the distribution of a first content item in a first channel can affect distribution of a second content item in a second channel. For example, in the advertising environment discussed above, an advertiser may distribute both television advertisements and Internet search advertisements for the advertiser's services. In this example, the delivery of the television advertisements may affect the delivery of the Internet search advertisements directly or indirectly. For example, if the advertiser wishes to increase spending on the television advertisements, the advertiser may reduce spending on the Internet search advertisements to stay within a predetermined advertising budget. Additionally, the delivery of the television advertisements may cause viewers to generate more searches for travel related terms in an Internet search engine, which will cause the advertiser's Internet search budget to be depleted more rapidly. In some cases, the advertiser's television advertisement activity could cause the number of searches for related terms to increase to a point where the advertiser's Internet search advertising budget, such as a daily budget, is met prematurely. After the budget is met, the advertiser's Internet search advertisements will no longer be selected for delivery to users searching for the related terms. Thus, some Internet search engine activity that is attributable to the advertiser's television advertisements may allow the advertiser's competitors to distribute advertisements in response to searches for related terms at a relatively low cost.

The exact effect that content item distribution activity in one channel will have on activity in another channel can be very difficult to predict accurately. Moreover, it can be difficult or impractical to adjust distribution parameters between and among different content items that are related in this way. For example, a television advertisement campaign for a product or service may have multiple different creatives, each of which is scheduled to run on multiple television channels at various times. Similarly, an Internet search advertisement campaign for the same or similar product or service can also have multiple different creatives, and can include bids on various keywords as well as other various targeting information, such as demographic profile targeting information. The number of viewers of the television advertisements is very difficult to determine, as is the anticipated effect of the number of viewers on subsequent Internet search activity attributed to the viewers of the television advertisements. Thus, it is difficult to know whether and how to adjust distribution parameters of the Internet search advertisements.

A computer system that automatically determines the viewership of one or more content items and that automatically adjusts or recommends adjustment of distribution parameters of another content item based on the determined viewership can allow content providers to distribute their content more efficiently and more effectively.

In one general aspect, distributing content includes receiving advertisement scheduling information for a television advertisement, receiving channel tune information regarding television viewing activity of television viewers, determining, by at least one processor, a number of viewers who viewed an airing of the advertisement, generating, by at least one processor, a number of search queries including one or more terms associated with the television advertisement, the number of search queries being generated based on a model of a relationship between the number of viewers who viewed the airing of the television advertisement and search query volume for searches that include one or more of the terms associated with the television advertisement, determining, by at least one processor, a budget amount for a campaign for a search advertisement, the campaign including a bid for one or more of the terms associated with the television advertisement, and distributing the search advertisement using the determined budget.

Implementations may include one or more of the following features. For example, distributing content further includes receiving information regarding search query volume for search queries including one or more of the terms associated with the television advertisement, and at least one of adjusting the budget for the search advertisement based on the information regarding search query volume and modifying the model based on the information regarding search query volume. The channel tune information includes information regarding a selected channel and information regarding a time of the channel selection.

In another general aspect, a system for distributing content includes a receiver that receives first content distribution information regarding how a first content item is to be distributed in a first content distribution channel and that receives activity information regarding user activity in the first content distribution channel. One or more processors determine content activity information regarding user activity in the first content distribution channel that involves the first content item based on the first content distribution information and the content activity information, and determine second content distribution information regarding how a second content item is to be distributed in a second content distribution channel based on the content activity information. A transmitter transmits the second content distribution information for use in distributing the second content item in the second content distribution channel.

Implementations may include one or more of the following features. For example, at least one of the first content item and the second content item include advertising content. The activity information includes television viewership information. The television viewership information includes channel tune information and time information. The content activity information includes information regarding a number of viewers of the first content item. The second content distribution information includes information regarding how content is to be distributed by a search engine provider. The second content distribution information includes at least one of bid price information and campaign budget information. The receiver further receives second channel activity information regarding activity in the second content distribution channel, and at least one processor adjusts how the second content distribution information is determined based on the second channel activity information. The second content distribution information is determined, at least in part, by predicting a search query volume for a search queries relating to the first content item, and the determination of the second content distribution information is adjusted, at least in part, by comparing actual search query volume to the predicted search query volume.

In another general aspect, distributing content includes receiving first content distribution information regarding how a first content item is to be distributed in a first content distribution channel, receiving activity information regarding user activity in the first content distribution channel, determining, by at least one processor, content activity information regarding user activity in the first content distribution channel that involves the first content item, the content activity information being determined based on the first content distribution information and the activity information, determining, by at least one processor, second content distribution information regarding how a second content item is to be distributed in a second content distribution channel, the second content distribution information being determined based, at least in part, on the determined content activity information in the first content distribution channel, and transmitting the second content distribution information for use in distributing the second content item in the second content distribution channel.

Implementations may include one or more of the following features. For example, at least one of the first content item and the second content item include advertising content. The activity information includes television viewership information. The television viewership information includes channel tune information and time information. The content activity information includes information regarding a number of viewers of the first content item. The second content distribution information includes information regarding how content is to be distributed by a search engine provider. The second content distribution information includes at least one of bid price information and campaign budget information. Distributing content further includes receiving second channel activity information regarding activity in the second content distribution channel and adjusting how the second content distribution information is determined based on the second channel activity information. Determining the second content distribution information includes predicting a search query volume for queries relating to the first content item, and adjusting how the second content distribution information is determined includes comparing actual search query volume to the predicted search query volume.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Content providers who choose to distribute content items face numerous decisions regarding how each content item should be distributed. For example, the content provider may need to choose a budget for distribution of the content item, and the content provider also may need to manage the budget for each content item in view of the budgets for distribution of other content items, possibly within a framework the includes a total budget for distribution of all content items. In some situations, a content provider may want to achieve specific goals by distributing the content items. For example, in an advertising situation where the content provider distributes advertising content items, the content provider way want to achieve selected target performance metrics, such as a target cost-per-click associated with Internet content items.

Figure 1:
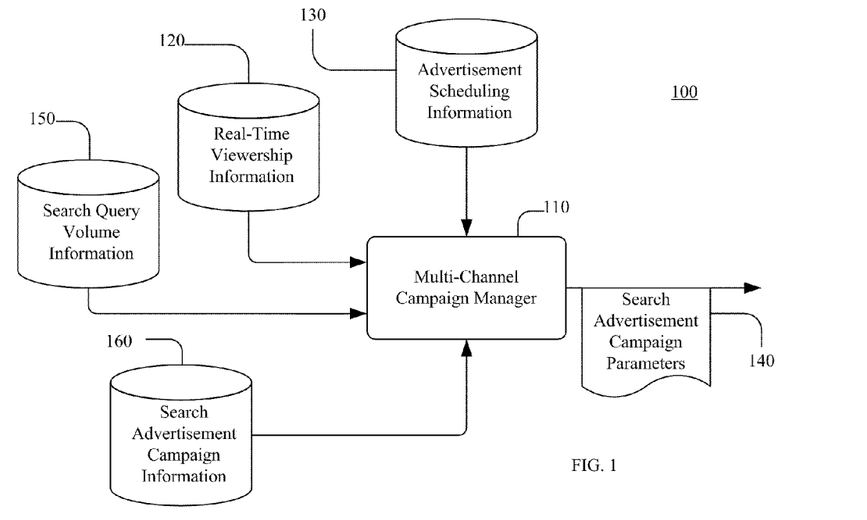
FIG. 1 is a diagram illustrating a system for managing distribution of advertising content.

In some implementations, a content provider distributes television advertisements that are displayed to television viewers and search advertisements that are provided to users of a search engine. FIG. 1 is a diagram illustrating a system 100 for managing distribution of adverting content that can automatically provide recommendations and/or control distribution of search advertisements in order to achieve or approach the content provider's selected goals. The system 100 includes a multi-channel campaign manager 110 that is configured to provide recommendations regarding content item distribution parameters or to manage content item distribution controls for one or more content items. In order to provide recommendations or manage distribution controls for a content item, the multi-channel campaign manager 110 is connected to, and receives information as inputs from, a real-time viewership information repository 120 and an advertisement scheduling information repository 130. Based on inputs from the real-time viewership information repository 120 and the advertisement scheduling information repository 130, the multi-channel campaign manager 110 generates search advertisement campaign parameter information 140 for one or more search advertisements. The search advertisement campaign parameter information 140 can be provided as a recommendation for review, approval, modification, and/or implementation by the content provider. Alternatively, the search advertisement campaign parameter information 140 can be provided as direct inputs to a search advertisement distribution platform to control distribution of one or more content items in the search advertisement distribution platform.

The real-time viewership information repository 120 includes real-time television viewership information regarding current user activity in a television system. The real-time viewership information indicates a number of viewers of each channel of a television system. For example, the real-time viewership information can include channel viewing information for all or some individual viewers of the television system, and the total number of individuals viewing a particular channel at a particular time, such as the current time, can be determined from the real-time viewership information.

Figure 6:
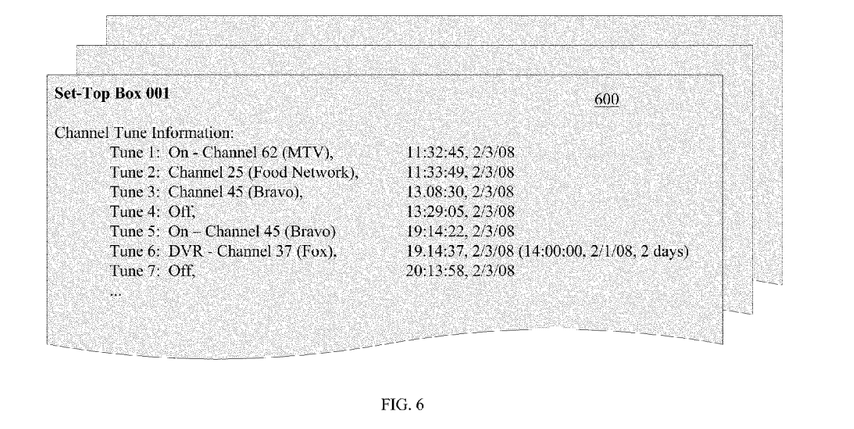
FIG. 6 is a diagram illustrating a data structure for storing advertising channel activity information.

In some implementations, the real-time viewership information repository 120 can include channel tune information that reports information regarding channel tune events for set-top boxes, or for other equipment used to control television viewing. FIG. 6 illustrates a data structure 600 stored in the real-time viewership information repository 120 that includes a list of channel tune information regarding input controls and a time associated with the input controls for each set-top box or other piece of equipment. As illustrated in FIG. 6, in a first tune event, Tune 1, a viewer using a set-top box identified as set-top box 001 turned on the set-top box to watch television at an indicated time, and the set-top box was tuned to an indicated channel. At a second time in a second tune event, Tune 2, the set-top box was tuned to a different channel. Thus, the set-top box was tuned to the indicated channel for the duration of the time between the indicated time and the second time. In this case, the first channel, the Music Television channel, was viewed for one minute and four seconds.

The advertisement scheduling information repository 130 includes information regarding scheduled or actual times and channels for distribution of television advertisements. The advertisement scheduling information can include information regarding an advertiser that provided the creative and information about the creative. For example, the advertisement scheduling information can include information regarding an advertisement group that includes multiple advertisement creatives and/or placements that are related to a product or group of products. Additionally, the advertisement scheduling information can include information regarding one or more advertisement slots or placement packages including a group of multiple advertisement slots. The advertisement scheduling information can also include information regarding associated keywords and/or related advertisement campaigns, such as related search advertisement campaigns.

Figure 5:
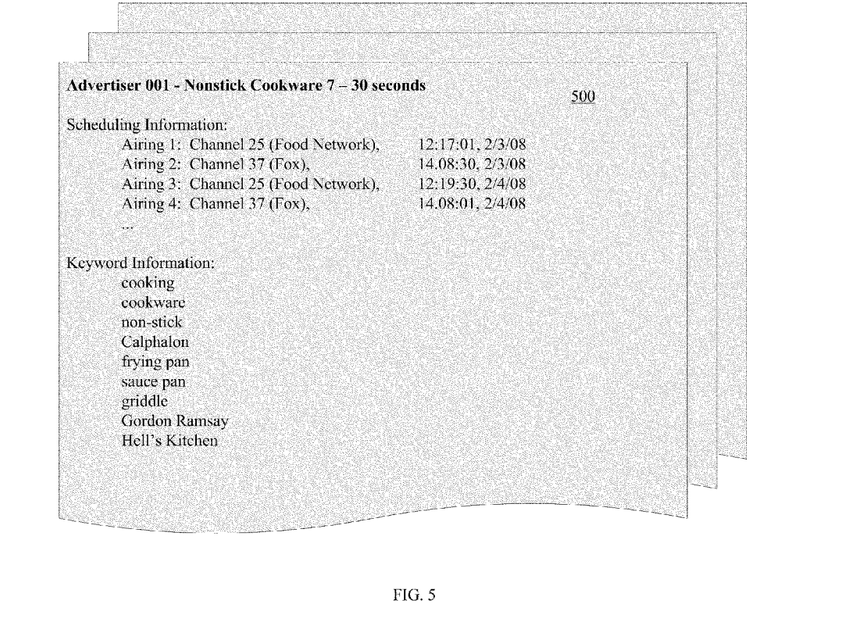
FIG. 5 is a diagram illustrating a data structure for storing content distribution information.

For example, in some implementations, the advertisement scheduling information repository 130 includes a data structure 500, illustrated in FIG. 5, that includes a list of scheduling information and a list of keyword information. The list of scheduling information includes time and channel information for actual or scheduled airings of the advertisement creative. The list of keyword information includes keywords associated with the advertisement creative, such as keywords that are included in written or spoken form in the advertisement creative, keywords relating to the advertised goods or services, the advertiser, or competitors, or other selected keywords that relate to the advertisement creative. The keywords and the advertisement creative are related such that airings of the advertisement have an effect on search query volume for queries that include or relate to one or more of the keywords.

The system 100 also includes a search query volume information repository 150 that includes historical information regarding activity of one or more search engines. For example, statistical information regarding user-provided search queries input to the search engines can be stored in the search query volume information repository 150. Time information can also be included in the search query volume information repository 150 such that the volume of search query terms can be determined as a function of time. The historical information can be used by the multi-channel campaign manager 110 in generating the search advertisement campaign parameter information 140.

The system 100 also includes a search advertisement campaign information repository 160 that includes information regarding one or more search advertisement campaigns. The search advertisement campaign information repository 160 can include information regarding distribution parameters for one or more creatives of a search advertisement campaign that is associated with one or more advertisements included in the advertisement scheduling information repository 130. For example, the search advertisement campaign information repository 160 can include keyword bid information and daily budget information for a search advertisement that is associated with the same product or service advertised by a television advertisement that is currently scheduled to run on one or more television channels.

Figure 2:
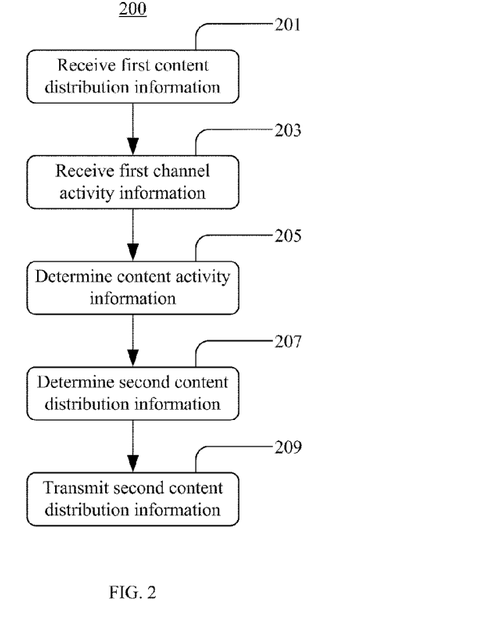
FIGS. 2 and 3 are diagrams illustrating processes for distributing advertising content.

In use, the system 100 can perform the process 200 illustrated in FIG. 2 to distribute content. According to the process 200, the multi-channel campaign manager 110 receives first content distribution information regarding how a first content item is to be distributed in a first content distribution channel (201). The multi-channel campaign manager 110 also receives activity information regarding user activity in the first content distribution channel (203). The activity information regarding user activity in the first content distribution channel can include information regarding all users of the first content distribution channel and all content items distributed in the first content distribution channel.

The multi-channel campaign manager 110 is operable to determine content activity information regarding user activity in the first content distribution channel that involves the first content item based on the first content distribution information and the activity information. (205). For example, the multi-channel campaign manager 110 can determine a number of individuals who viewed the first content item during a first time period, or a number of impressions of the first content item distributed through the first content distribution channel during the first period of time.

After determining the content activity information, the multi-channel campaign manager 110 can determine recommended second content distribution information regarding how a second content item is to be distributed in a second content distribution channel based, at least in part, on the determined content activity information (207). For example, based on a number of individuals who viewed the first content item, the multi-channel campaign manager 110 can determine an anticipated level of user activity in the second content distribution channel that relates to the second content item. This determination can be made based on a model that correlates activity in the first content distribution channel involving the first content item to activity in the second content distribution channel.

The recommended second content distribution information is then transmitted for use in distributing the second content item in the second content distribution channel (209). For example, the recommended second content distribution information can be transmitted to a content provider associated with the second content item for review, modification, and/or approval. After approval, content distribution parameters associated with the second content item can then be generated or modified such that the second content item is distributed according to the approved second content distribution information.

Figure 3:
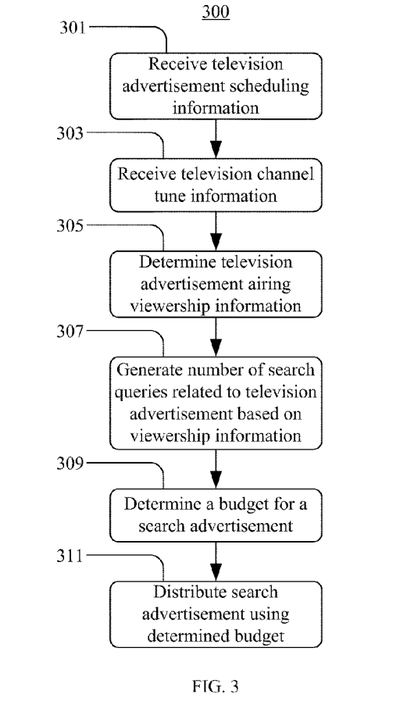

In some implementations, as illustrated in FIG. 3, the system 100 is operable to distribute a search advertisement. For example, the multi-channel campaign manager 110 receives advertisement scheduling information for a television advertisement from the advertisement scheduling information repository 130 (301) and receives channel tune information regarding television viewing activity of television viewers from the real-time viewership information repository 120 (303). Then, the multi-channel campaign manager 110 determines television advertisement airing viewership information, such as a number of viewers who viewed an airing of the television advertisement (305). The number of viewers can be determined based on a time and channel on which the television advertisement was aired as indicated by the advertisement scheduling information and a number of viewers of the channel at the time the advertisement was aired as indicated in the channel tune information.

The multi-channel campaign manager 110 can then generate a number of search queries including one or more terms associated with the television advertisement that are expected to be received based on the advertisement airing viewership information (307). The number of search queries can be generated based on a model of a relationship between the number of viewers who viewed the airing of the television advertisement and search query volume for searches that include one or more of the terms associated with the television advertisement. For example, the model may relate a number of viewers of an airing of the television advertisement to a number of additional search queries for a keyword relating to an advertised product that are expected to be received in a twenty-four hour period following the airing.

The multi-channel campaign manager 110 then determines a budget amount for a campaign for a search advertisement that includes a bid for one or more of the terms associated with the television advertisement (309) based on the expected number of search queries. For example, the multi-channel campaign manager 110 can increase the daily budget for the search advertisement campaign by an amount sufficient to allow the search advertisement to be selected for distribution with search results for each additional search query. The search advertisement is then distributed using the determined budget amount (311).

Figure 4:
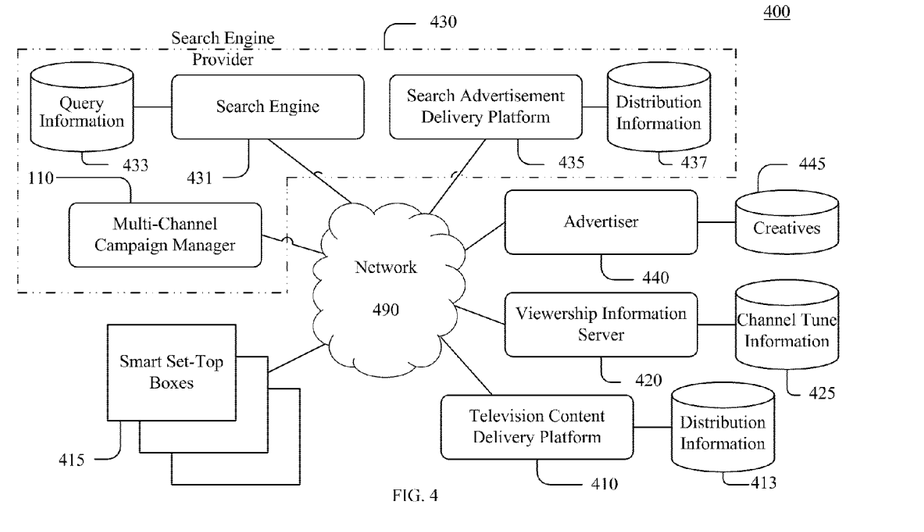
FIG. 4 is a diagram illustrating a multi-channel system for distributing content.

In some implementations, as illustrated in FIG. 4, the multi-channel campaign manager 110 can be included as part of a multi-channel system for distributing content 400. The system 400 includes a television content distribution platform 410 that controls distribution of television content items to customers, such as television shows and television advertisements. The television content distribution platform 410 includes a distribution information repository 413 that includes copies of the content items and information regarding scheduling of distribution of the content items. For example, the distribution information repository 413 can include the advertisement scheduling information repository 130.

Some or all of the customers use smart set-top boxes 415 to access the content items distributed by the television content distribution platform 410. The smart set-top boxes 415 are configured to report user activity information, such as channel tune information, recording instructions, and/or on-demand ordering information to a television viewership information server 420. The television viewership information server 420 includes a channel tune information repository 425 that includes compiled user activity information received from the smart set-top boxes 415, and can include the real-time viewership information repository 120.

The system 400 also includes a search engine provider 430 that includes a search engine 431, a query information repository 433, a search advertisement delivery platform 435, a search advertisement distribution information repository 437, and the multi-channel campaign manager 110. The search engine 431 is operable to receive search queries from users and to provide search results to the users in response to the search queries. Information regarding received search queries, such as time of query and keywords included in the query, is stored in the query information repository 433. For example, the query information repository can include the search query volume information repository 150.

In addition to search results, the search engine 431 also provides search advertisements to users in response to the search queries. The search advertisement delivery platform 435 is operable to select the search advertisements for delivery to the user from among candidate advertisements based on the search queries. Information regarding the search advertisements is stored in the search advertisement distribution information repository 437, and is used to determine which search advertisements are candidates for delivery to a user based on the search query provided by the user, and to select which advertisements to deliver to the user from among the candidate advertisements. For example, the advertisement information can include information regarding bids for selected keywords provided by an advertiser 440 that provided an advertisement campaign associated with an advertisement creative that is stored in an advertisement creative repository 445. The search advertisement delivery platform 435 can be configured to identify candidate advertisements from among all available advertisements based on a match between the keyword bid information associated with the advertisements and the keywords included in a search query, and to select from among the identified candidate advertisements based on bid amount, advertisement relevance, advertisement quality, advertisement performance information, and/or user information, such as preferences and/or demographic information.

Figure 7:
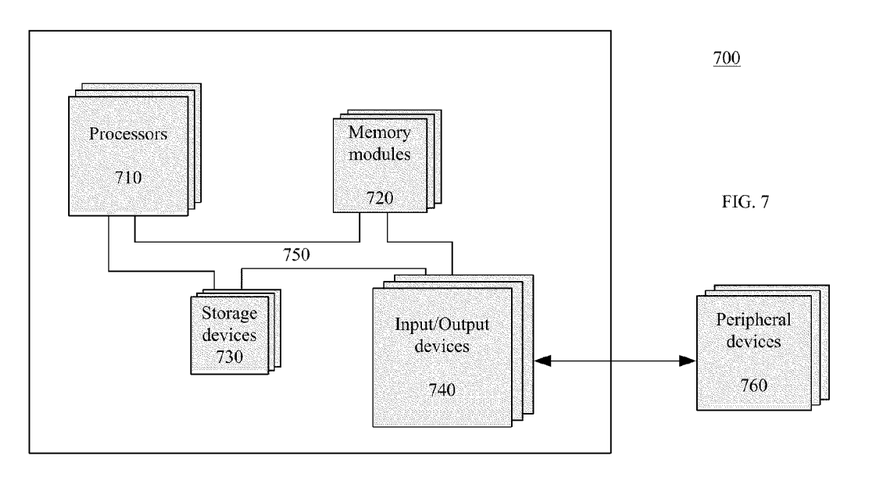
FIG. 7 is a diagram of a computer system operable in the system of FIG. 4.

Some or all of the components of the system 400, including the multi-channel campaign manager 110, can be formed as or include one or more components of a computer system, such as the computer system 700 illustrated in FIG. 7. The computer system 700 includes one or more processors 710, one or more memory modules 720, one or more storage devices 730, and one or more input/output devices 740, and a system bus 750. The one or more input/output devices 750 are operable with one or more peripheral devices 760 for inputting signals to and/or for receiving signals from the computer system 700. One or more of the input/output devices 740 can be operable to allow the computer system 700 to communicate with one or more other computer systems or components over a computer network, such as a network 490 of FIG. 4, which can include the Internet and/or other communications networks.

Figure 8:
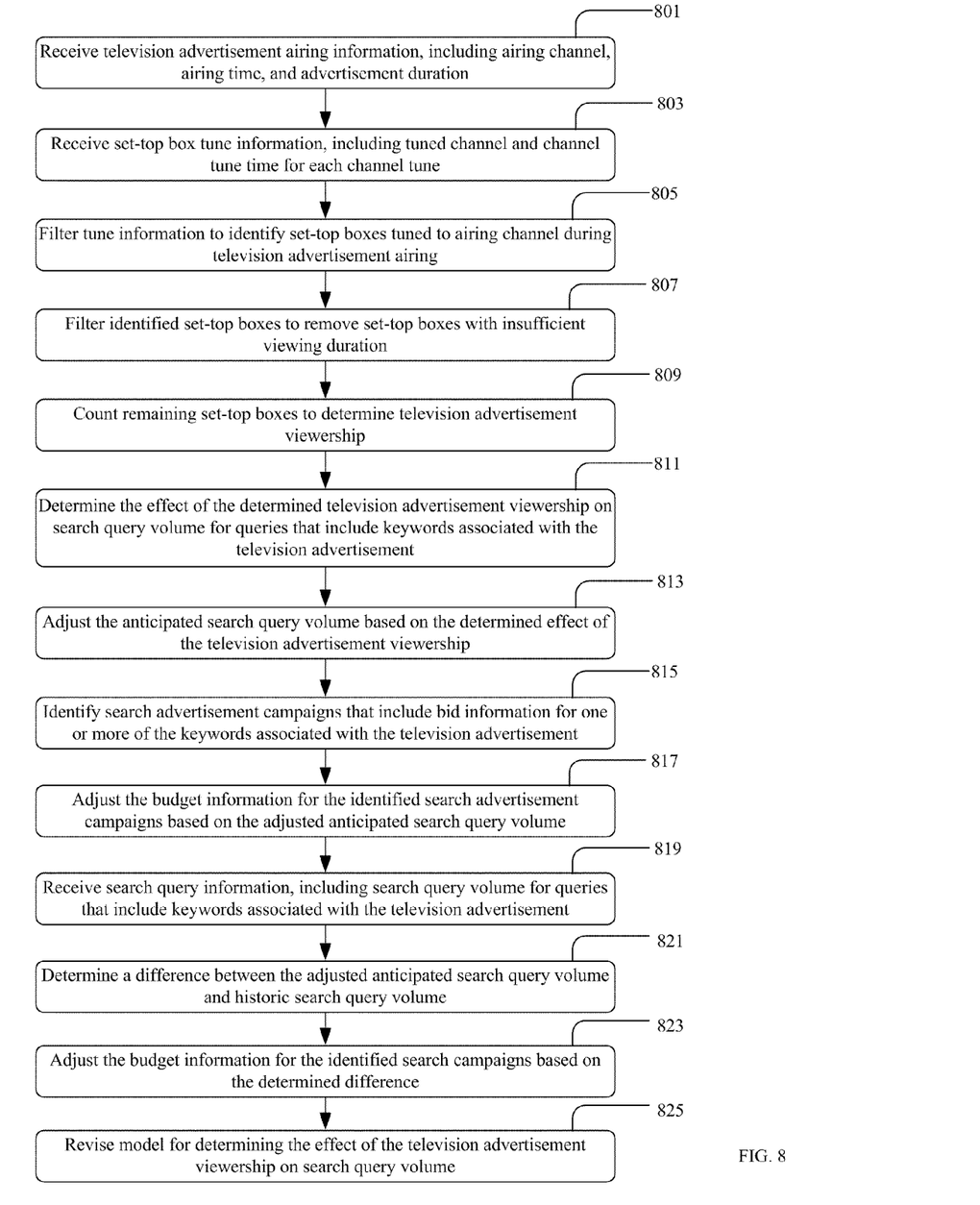
FIG. 8 is a diagram illustrating a process for distributing advertising content.

In use, the system 400 can be used to perform a process 800 for managing distribution of content items illustrated in FIG. 8. According to the process 800, the multi-channel campaign manager 110, or another device, receives television advertisement airing information, including airing channel, airing time, and advertisement duration from the television content delivery platform 410 (801). The multi-channel campaign manager 110 also receives, from the smart set-top boxes 415, channel tune information, including information indicating a tuned channel and channel tune time for each channel tune (803).

The multi-channel campaign manager 110 then filters the received channel tune information to identify set-top boxes tuned to an advertisement airing channel during an airing of a television advertisement (805). For example, as illustrated in FIGS. 5 and 6, a television advertisement for non-stick cookware (nonstick cookware 7, provided by advertiser 001) was aired on the Food Network at 12:17:01 on Feb. 3, 2008. The channel tune information for Set-Top Box 001 indicates that Set-Top Box 001 was tuned to the Food Network for the entire 30 second duration of the airing of the advertisement on Feb. 3, 2008 since the user of Set-Top Box 001 tuned to the Food Network at 11:33:49 and did not tune to another channel or turn off the set-top box until 13:08:30. Thus, in filtering the received channel tune information, the multi-channel campaign manager 110 would identify the Set-Top Box 001 as being tuned to the airing channel at the time of an airing of the advertisement.

The multi-channel campaign manager 110 then filters the list of identified set-top boxes to remove set-top boxes with insufficient viewing duration (807). For example, set-top boxes that have channel tune information that indicates that the set-top box was tuned to the airing channel for less than 10 of the 30 seconds of the advertisement may be removed from the list. Once the channel tune information is filtered to identify the set-top boxes that were tuned to the airing channel for a sufficient amount of the duration of the airing of the advertisement, the multi-channel campaign manager 110 counts the remaining set-top boxes to determine television advertisement viewership (809), such as a number of set-top boxes through which the airing of the advertisement was viewed.

A model of a relationship between television advertisement viewership and search query volume is used to determine the effect of the determined television advertisement viewership on search query volume for queries that include keywords associated with the television advertisement (811). For example, a specific model for each advertisement may be created based on an analysis of historical relationships between viewership of an advertisement and search query volume for queries that include selected keywords. As illustrated in FIG. 5, the advertisement for non-stick cookware includes information regarding multiple associated keywords, such as the terms cooking, cookware, and non-stick, which describe the advertised product generally. The associated keywords can also include keywords that identify the advertiser, such as a brand name or company name, a competitor, a spokesperson or endorsing individual or organization, and/or a marketing partner, such as the television program during which the advertisement is aired. In addition to, or instead of advertiser selection of the associated keywords, the keywords associated with the television advertisement can be derived from the advertisement creative, such as through speech-to-text or closed-captioning analysis and text keyword extraction techniques. Similarly, logo recognition or other techniques can be used to generate the list of associated keywords for each advertisement creative.

As another alternative or additional technique, an analysis of historical search query volume information and information regarding historical airings of the advertisement can be used to identify keywords included in search queries for which a statistically meaningful increase in query volume is present in correlation with the advertisement airing schedule. Such an analysis can also be used in developing the model of the relationship between the advertisement viewership and search query volume. For example, the analysis may reveal that for every set-top box tuned to an airing of an advertisement, search query volume for queries including a first term increase by a half of one percent during a twenty-four hour period following the airing. This information can be used to identify the first term as a keyword associated with the advertisement, as well as to predict a change in search query volume for queries including the term by multiplying the per-viewer search volume change rate and the number of set-top boxes tuned to an airing of the advertisement. The multi-channel campaign manager 110 then adjusts an anticipated search query volume based on the determined effect of the television advertisement viewership (813), such as by combining a base-line predicted search query volume and the predicted change in search query volume.

The multi-channel campaign manager 110 also identifies all of the search advertisement campaigns that include bid information for one or more of the keywords associated with the television advertisement (815). Then, the multi-channel campaign manager adjusts the budget information for each of the identified search advertisement campaigns based on the adjusted anticipated search query volume (817). For example, if the viewership of the television advertisement results in a predicted increase in the anticipated search query volume compared to the base-line predicted search query volume, the multi-channel campaign manager 110 can determine how much additional budget is necessary to allow the search advertisements in the campaign to be considered for selection for delivery with the search results for each of the additional anticipated queries, and can recommend increasing the budget by a corresponding amount. In some implementations, the additional budget amount is determined as the product of a historic selection rate for the advertisement, a historic cost of selection, and the additional number of queries that are expected. Similarly, if a campaign includes bids for two or more keywords associated with the television advertisement, then the predicted effect on search query volume for each of the keywords can be combined when adjusting the budget information for the search advertisement campaigns.

In some implementations, additional or different campaign distribution parameters can be adjusted. For example, the bid amounts for individual keywords can be adjusted based on the television advertisement viewership information. Such keyword bid amount adjustment may be implemented where an analysis of the relationship between television advertisement viewership and search query volume information indicates that relevant search queries are more focused on other keywords during a certain time period after the airing of the television advertisement. As one general example, potential customers may search for keywords that relate to a product generally, such as "non-stick" and "cookware." However, during the hour following an airing of a television advertisement for a particular model of non-stick cookware, potential customers may search for the particular model much more frequently by name. Thus, in order to effectively use the campaign budget for a related search advertisement, the multi-channel campaign manager may recommend, or automatically implement, a reduction in the bid amounts for generic keywords, such as "non-stick" and "cookware", and an increase in bid amount for a specific keyword, such as the model name.

In other implementations, the multi-channel campaign manager may recommend, or automatically implement, a reduction in bid amount for all keywords for a campaign instead of, or in combination with, an increase in total budget for the campaign. In this way, bids of competing advertisements that remain unchanged may exhaust an advertising budget for the competing advertisements. This may allow the advertisements of the adjusted campaign to be selected a greater number of times at a lower cost to the advertiser. Thus, it should be understood that the distribution parameters of the search advertisement can be adjusted in many ways based on a predicted change in search activity. The particular algorithm for determining the change can be selected based on many factors, including the goals of the advertiser and the relationship between viewership of the television advertisement and the resulting effect on search activity.

In order to improve the accuracy of the predictions made by the multi-channel campaign manager 110, historic search query volume information can be fed back to the multi-channel campaign manager 110. For example, and with continued reference to FIG. 8, as time passes after adjusting the budget information, the multi-channel campaign manager 110 receives historic search query information that includes search query volumes for queries that include keywords associated with the television advertisement (819). A difference between the actual number of search queries that include keywords associated with the television advertisement and the anticipated number of search queries that include keywords associated with the television advertisement is determined (821). Based on the determined difference, the budget information for the identified search campaign is adjusted again (823). For example, if the actual search query volume for queries that include a keyword of the search campaign is less than was predicted, then the budget of the search campaign can be reduced by a corresponding amount, and the budgets of one or more other campaign can be increased, including the budgets of television advertisements, or the budgets of the one or more other campaigns may be left unchanged so as to achieve a reduction in costs. Thus, in some implementations, the multi-channel campaign manager 110 can operate to achieve an optimum allocation of a fixed total budget between advertisements in two or more advertisement channels.

In addition to revising the adjustment to the budget, the multi-channel campaign manager can revise the model used to determine the effect of the television advertisement viewership on the anticipated search query volume (825). For example, if the predicted search query volume exceeded the actual search query volume for queries that include keywords associated with the television advertisement, then the model can be adjusted to predict a smaller increase in search query volume based on a given number of viewers of the television advertisement.

While some implementations are described above, these should not be viewed as exhaustive or limiting, but rather should be viewed as exemplary, and included to provide descriptions of various features. It will be understood that various modifications may be made. For example, the multi-channel campaign manager 110 can receive content item viewership information from a provider of such information, such as the viewership information server 420, instead of determining content item viewership information from information regarding user activity involving the content item and content item scheduling information.

Accordingly, other embodiments are within the scope of the following claims.

The invention claimed is:

1. A computer-implemented method for distributing content, the method comprising:
receiving advertisement scheduling information for a television advertisement;
receiving channel tune information regarding television viewing activity of television viewers;
determining a number of viewers who viewed an airing of the television advertisement based on the advertisement scheduling information and the channel tune information;
determining a number of search queries including one or more terms associated with the television advertisement, the number of search queries being generated based on a model of a relationship between the number of viewers who viewed the airing of the television advertisement and search query volume for searches that include one or more of the terms associated with the television advertisement;
determining a budget amount for a campaign for a search advertisement, the campaign including a bid for one or more of the terms associated with the television advertisement;
adjusting the budget amount for the campaign and the bid for the one or more of the terms associated with the television advertisement based on the number of search queries; and
distributing the search advertisement using the adjusted budget.

2. The computer-implemented method of claim 1, further comprising receiving information regarding the search query volume for the search queries including the one or more terms associated with the television advertisement, and modifying the model based on the information regarding the search query volume.

3. The computer-implemented method of claim 1, wherein the channel tune information includes information regarding a selected channel and information regarding a time of the channel selection.

4. A system comprising:
one or more computers and one or more storage devices storing instructions that are operable, when executed by the one or more computers, to cause the one or more computers to perform operations comprising:
receiving advertisement scheduling information for a television advertisement;
receiving channel tune information regarding television viewing activity of television viewers;
determining a number of viewers who viewed an airing of the television advertisement based on the advertisement scheduling information and the channel tune information;
determining a number of search queries including one or more terms associated with the television advertisement, the number of search queries being generated based on a model of a relationship between the number of viewers who viewed the airing of the television advertisement and search query volume for searches that include one or more of the terms associated with the television advertisement;
determining a budget amount for a campaign for a search advertisement, the campaign including a bid for one or more of the terms associated with the television advertisement;
adjusting the budget amount for the campaign and the bid for the one or more of the terms associated with the television advertisement based on the number of search queries; and
distributing the search advertisement using the adjusted budget.

5. The system of claim 4, the operations further comprising receiving information regarding the search query volume for the search queries including the one or more terms associated with the television advertisement, and modifying the model based on the information regarding the search query volume.

6. The system of claim 4, wherein the channel tune information includes information regarding a selected channel and information regarding a time of the channel selection.

7. One or more non-transitory machine-readable media storing instructions that are executable by one or more processing devices to perform operations comprising:
receiving advertisement scheduling information for a television advertisement;
receiving channel tune information regarding television viewing activity of television viewers;

determining a number of viewers who viewed an airing of the television advertisement based on the advertisement scheduling information and the channel tune information;

determining a number of search queries including one or more terms associated with the television advertisement, the number of search queries being generated based on a model of a relationship between the number of viewers who viewed the airing of the television advertisement and search query volume for searches that include one or more of the terms associated with the television advertisement;

determining a budget amount for a campaign for a search advertisement, the campaign including a bid for one or more of the terms associated with the television advertisement;

adjusting the budget amount for the campaign and the bid for the one or more of the terms associated with the television advertisement based on the number of search queries; and distributing the search advertisement using the adjusted budget.

8. The medium of claim 7, the operations further comprising receiving information regarding the search query volume for the search queries including the one or more terms associated with the television advertisement, and modifying the model based on the information regarding the search query volume.

9. The medium of claim 7, wherein the channel tune information includes information regarding a selected channel and information regarding a time of the channel selection.

* * * * *